(12) United States Patent
Park

(10) Patent No.: US 8,556,470 B2
(45) Date of Patent: Oct. 15, 2013

(54) ILLUMINATOR

(75) Inventor: Sanghyun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 313 days.

(21) Appl. No.: 12/856,435

(22) Filed: Aug. 13, 2010

(65) Prior Publication Data

US 2011/0038175 A1    Feb. 17, 2011

(30) Foreign Application Priority Data

Aug. 14, 2009    (KR) .................. 10-2009-0075226

(51) Int. Cl.
*F21V 21/00*    (2006.01)

(52) U.S. Cl.
USPC .......................................... 362/312

(58) Field of Classification Search
USPC ................................ 362/600–634
See application file for complete search history.

(56) References Cited

U.S. PATENT DOCUMENTS

| | | | |
|---|---|---|---|
| 6,154,595 A | 11/2000 | Yokogawa et al. | |
| 7,481,954 B2* | 1/2009 | Warren et al. | 252/582 |
| 2001/0022723 A1 | 9/2001 | Siminovitch et al. | |
| 2005/0276566 A1* | 12/2005 | Iimura | 385/146 |
| 2007/0091639 A1* | 4/2007 | Yoo | 362/612 |
| 2007/0242473 A1 | 10/2007 | Lee et al. | |
| 2007/0258263 A1* | 11/2007 | Kim | 362/602 |
| 2008/0304288 A1* | 12/2008 | Iwasaki | 362/632 |
| 2010/0026707 A1* | 2/2010 | Hoogenstraaten et al. | 345/595 |
| 2010/0027293 A1* | 2/2010 | Li | 362/619 |
| 2010/0309102 A1* | 12/2010 | Jung | 345/82 |

FOREIGN PATENT DOCUMENTS

| | | |
|---|---|---|
| KR | 10-0794351 B1 | 1/2008 |
| KR | 10-0813703 B1 | 3/2008 |
| KR | 10-2009-0012925 A | 2/2009 |

* cited by examiner

*Primary Examiner* — Nimeshkumar Patel
*Assistant Examiner* — Christopher Raabe
(74) *Attorney, Agent, or Firm* — Birch, Stewart, Kolasch & Birch, LLP

(57) ABSTRACT

An illuminator including a bottom member having a guide face of a polygonal configuration arranged therein, a light source mounted on the guide face, a light guide member positioned inside the guide face of the polygonal configuration and optically aligned with the light source, and a top member coupled to the bottom member to protect the light source is provided.

10 Claims, 11 Drawing Sheets

ILLUMINATOR

CROSS-REFERENCE TO RELATED APPLICATIONS

Pursuant to 35 U.S.C.§119(a), this application claims the benefit of earlier filing date and right of priority to Korean Patent Application No. 10-2009-0075226, filed on Aug. 14, 2009, the contents of which are hereby incorporated by reference in its entirety

BACKGROUND OF THE INVENTION

1. Field of the Invention

The present disclosure relates to an illuminator capable of enhancing its thermal dissipation property.

2. Description of Related Art

Most conventional light sources currently used include incandescent light bulbs, discharge lamps, and fluorescent light lamps. These light sources have been developed in varying forms and used for various purposes, such as for uses in homes, uses in landscaping, and uses in commercial/industrial applications.

However, despite the prevalence of these light sources, each of these light sources suffers from one or more problems. For example, a resistive light source such as the incandescent light bulb has low efficiency and high thermal emission, the discharge lamp has high cost and requires high voltage, and the fluorescent light lamp uses mercury, which may have environmental issues.

In order to solve the problems caused by such light sources, the use of a light emitting diode for illumination has become an increasing object of attention. The light emitting diode has many advantages over conventional light sources, such as efficiency, ability to provide various color schemes, and self-regulating design. Accordingly, the illumination industry has become more focused on using light emitting diodes to provide illumination.

In particular, there is an increasing demand for a surface light source that has uniform optical characteristics as compared with that of point/line of light sources.

BRIEF SUMMARY OF THE INVENTION

In one general aspect of the present disclosure, an illuminator is provided that includes a bottom member having a guide face of a polygonal configuration formed therein, a light source mounted on the guide face of the bottom member, a light guide positioned inside the guide face of the bottom member, the light guide being optically aligned with the light source, and a top member coupled to the bottom member to protect the light source.

In another general aspect of the present disclosure, an illuminator is provided that includes a bottom member having a groove of a polygonal configuration defined by a plurality of side walls formed in the bottom member, a circuit board mounted on each side wall of the groove, each circuit board having at least one light emitting diode mounted thereon, a light guide member positioned inside the groove and optically aligned with the light emitting diodes, and a top member coupled to the bottom member to protect the light emitting diodes.

In yet another general aspect of the present disclosure, an illuminator is provided that includes a bottom member, a guide unit of a polygonal ring configuration located on the bottom member, a plurality of first circuit boards mounted on an inner side of the guide unit, each of the first circuit boards having a first light emitting diode mounted thereon, a plurality of second circuit boards mounted on an outer side of the guide unit, each of the second circuit boards having a second light emitting diode mounted thereon, a light guide member positioned inside the guide unit, the light guide member being optically aligned with the first light emitting diodes, and a top member coupled to the bottom member to protect the first and second light emitting diodes.

Further scope of applicability of the present application will become more apparent from the detailed description given hereinafter. However, it should be understood that the detailed description and specific examples, while indicating preferred exemplary embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the disclosure and are incorporated in and constitute a part of this application, illustrate exemplary embodiment(s) of the disclosure and together with the description, serve to explain the principle of the disclosure. In the drawings.

DETAILED DESCRIPTION OF THE INVENTION

Hereinafter, the present invention will become more fully understood from the detailed description given with reference to the accompanying drawings. A first exemplary embodiment of an illuminator will be described with reference to FIGS. 1-5.

Figure 1:
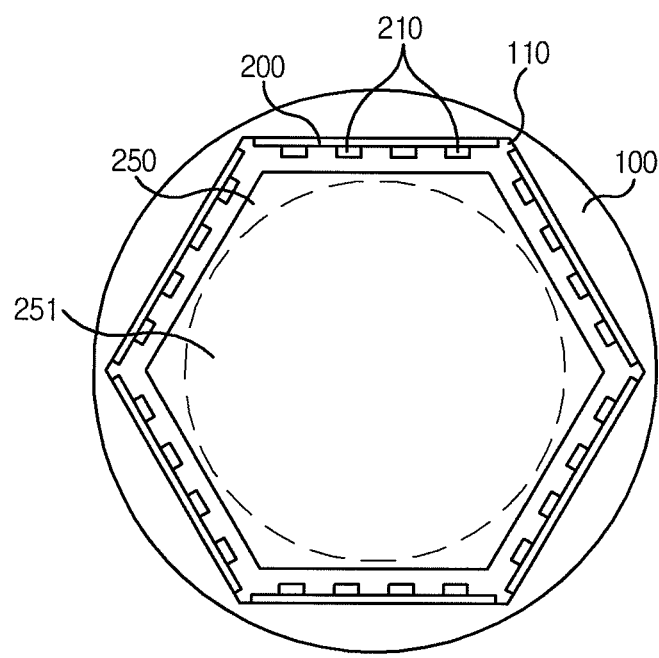
FIG. 1 is a schematic plain view illustrating an illuminator according to a first exemplary embodiment of the present disclosure.

FIG. 1 is a schematic plain view explaining an illuminator according to a first exemplary embodiment of the present disclosure, and the illuminator of the present disclosure is constructed of a bottom member having a light source mounted thereon; and a top member to protect the light source from outside. In this first exemplary embodiment, it is desirable for the light source to be a light emitting diode mounted on the bottom member. That is, as shown in FIG. 1, the bottom member 100 has a guide face 110 of a polygonal configuration and each face of the guide face 110 of the polygonal configuration has a circuit board 200 on which light emitting diodes 210 are mounted. A light guide member 250 optically aligned with the light emitting diodes 210 is positioned inside the guide face 110.

The bottom member 100 may be coupled with a top member (described below with reference to FIG. 2) having a window through which an inside area 251 of the light guide member 250 is exposed. Therefore, the light emitted from the light emitting diodes 210 is transferred to the light guide member 250 and then transmitted to the inner area 251 of the light emitting member 250 exposed through the window of the top member (inner area of dotted line in FIG. 1) so that an illumination function is performed.

In this first exemplary embodiment, it the circuit board 200 may be a printed circuit board or a metal printed circuit board on which the light emitting diodes 210 are mounted. Further, the bottom member 100 may be formed of any materials having an excellent thermal conductivity, and most preferably, it may be formed of metal. Therefore, the illuminator of the present disclosure has an advantage that a thermal dissipation property can be enhanced by dissipating heat generated in the light emitting diodes 210 through the bottom member 100. Further, the illuminator of the present disclosure has an advantage that if the guide face 110 is flat, and because the circuit boards 200 contacts the flat face, the contact area between the bottom member 100 and the circuit boards 200 is increased, whereby the thermal dissipation property can be increased.

Further, in the illuminator of the present disclosure, the thermal dissipation effect to dissipate heat generated when operating the light emitting diodes 210 can be maximized when a gap between the light emitting diodes 210 is designed to be greater than each width of the light emitting diodes 210.

At the same time, it is desirable that the light guide member 250 has a polygonal configuration corresponding to the polygonal configuration of the guide face 110. That is, because the light emitting diodes 210 are mounted on the guide face 110, the light guide member 250 can be arranged to provide a face parallel to the guide face 110 in order to obtain an excellent optical alignment with the light emitting diodes 210. For example, when the configuration of the guide face arranged on the bottom member is hexagonal, as shown, the light guide member could also be constructed of a hexagonal configuration. Accordingly, the illuminator of the present disclosure has an advantage that it can be processed with ease since the light guide member of a polygonal configuration can be applied It should be understood that the number of guide faces is not limited to six, for example, the guide faces may form an octagonal shape. In this arrangement, when the circuit boards having light emitting diodes mounted thereon are mounted on each face of the eight guide faces of the polygonal configuration, the light emitting diodes are optically aligned with eight side walls of the light guide member. In addition, the light emitting efficiency of the illuminator can be enhanced by mounting ten light emitting diodes on each circuit board. That is, the light emitting efficiency of the illuminator can be enhanced when eighty light emitting diodes are aligned on the side wall of the polygonal light guide member and the light emitted from the eighty light emitting diodes is incident toward the polygonal light guide member. At this time, the light emitting efficiency may be different depending on the size of the light guide member and the gap between the light guide member and the light emitting diodes.

Figure 2:
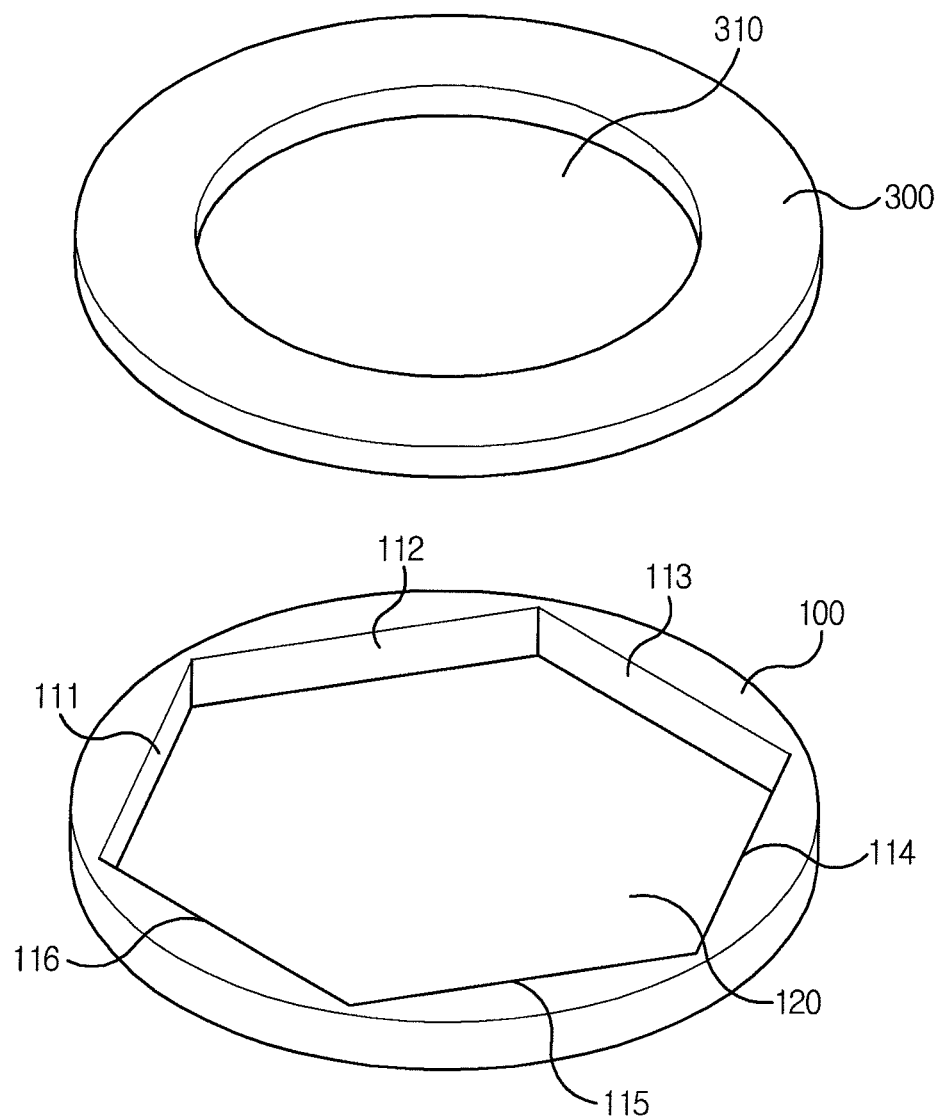
FIG. 2 is a schematic perspective view illustrating an illuminator according to the first exemplary embodiment of the present disclosure.

FIG. 2 is a schematic perspective view illustrating the illuminator according to the first exemplary embodiment of the present disclosure. As described above, the illuminator according to the first exemplary embodiment of the present disclosure is constructed of a bottom member 100 and a top member 300. In this permutation of the first exemplary embodiment, the bottom member 100 has a groove 120 of a polygonal configuration formed therein, and circuit boards 200 having light emitting diodes mounted thereon can be mounted on side walls 111, 112, 113, 114, 115 and 116 of the groove 120 of the polygonal configuration. The top member 300 may have a window 300 formed therein, and the top member 300 is positioned on the bottom member 100. The bottom member 100 and top member 300 may be coupled using conventional coupling portions. The coupling portion may be formed of various constructions to couple two or more discrete structures.

Figure 3:
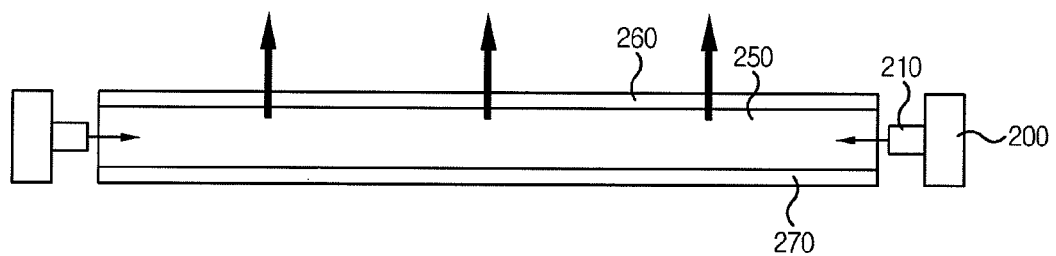
FIG. 3 is a schematic conceptual view illustrating an illuminating operation on a light guide member according to the first exemplary embodiment of the present disclosure.

FIG. 3 is a schematic conceptual view illustrating an illuminating operation of the light guide member 250 according to the first exemplary embodiment of the present disclosure. The light guide member 250 is formed of a polygonal configuration and a circuit board 200 having light emitting diodes 210 mounted thereon is optically aligned on each side of the polygonal configuration. Therefore, light emitted from the light emitting diodes 210 is transferred to the light guide member 250 and then transmitted above the light guide member 250.

In addition to the light guide member 250, it may be desirable to arrange a reflective member 270 beneath the light guide member 250 and a diffusion member 260 on the light guide member 250. Accordingly, light progressing below the light guide member 250 is reflected on the reflective member 270 towards the light guide member 250, transferred through the light guide member 250, and uniformly diffused through the diffusion member 260 to be visible outside the illuminator.

Figure 4:
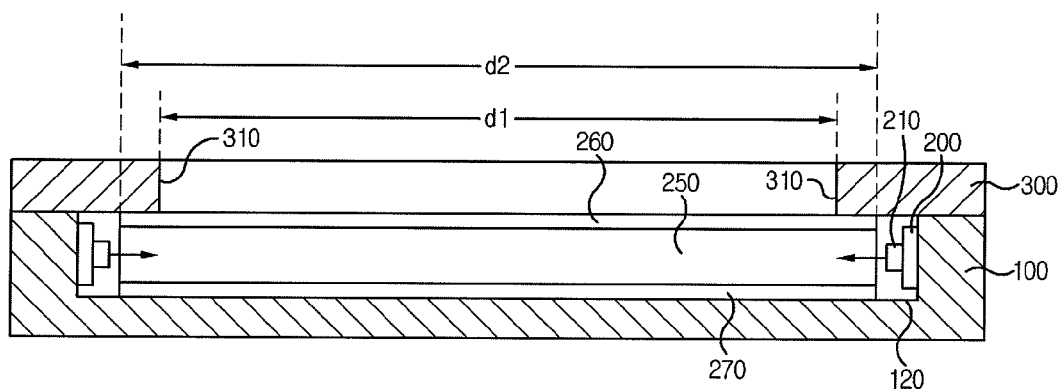
FIG. 4 is a sectional view of an illuminator according to the first exemplary embodiment of the present disclosure.

FIG. 4 is a sectional view of an illuminator according to the first exemplary embodiment of the present disclosure. Referring to FIG. 4, the groove 120 of the polygonal configuration is formed in the bottom member 100. A circuit board 200 having light emitting diodes 210 mounted thereon is mounted on side walls of the groove 120 and a light guide member 250 is located inside the groove 120. The light emitting diodes 210 and the light guide member 250 are optically aligned so that the light emitted from the light emitting diodes 210 is transferred to the light guide member 250. It is understood that the light guide member 250 can be assembled by positioning the reflective member 270 between the light guide member 250 and the bottom member 210 and placing the diffusion member 260 on the light guide member, as shown in FIG. 3. The top member 300 is disposed above the bottom member 100 and may be coupled to the bottom member 100 using a predetermined coupling portion (not shown), thereby finishing the assembly of the illuminator.

In this arrangement, the top member 300 has the window 310 formed inside it such that the light passing through the light guide member 250 and diffusion member 260 is discharged to the outside to provide illumination.

Meanwhile, the intensity of the light out of the light emitting diodes 210 is high and so a spot light may be transmitted to the outside indicating the locations of the light emitting diodes 210. When light emission from the light emitting diodes 210 revealing the location of the light emitting diodes 210 is visible, the beauty of the illumination may be deteriorated. To avoid this situation, the diameter d1 of the window 310 should be smaller than the diameter d2 of the light guide member 250. It is also desirable that the window 310 is positioned in the inner area 251 of the light guide member 250.

Figure 5:
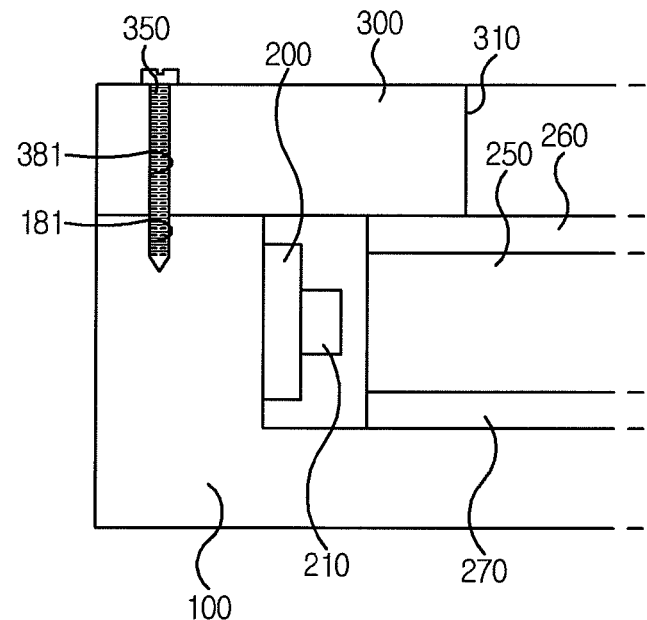
FIG. 5 is a partial schematic view illustrating an example in which a top member and a bottom member are coupled to each other according to the first exemplary embodiment of the present disclosure.

FIG. 5 is a partial schematic view illustrating one possible arrangement for coupling the top member 300 and bottom member 100 together. In this exemplary arrangement, the top member 300 and the bottom member 100 have screw grooves 381 and 181 communicating with each other, respectively, and a coupling screw 350 is inserted into the screw grooves 381 and 181. Therefore, when the top member 300 is mounted on the bottom member 100 and the coupling screw 350 is inserted into the screw grooves 381 and 181 in the top member 300, the top member 300 and the bottom member 100 are coupled and fixed together. While this exemplary embodiment shows screw grooves 381 and 181, it is understood that one of the screw grooves can be replaced with through holes so long as coupling screw 350 are inserted from the side having the through holes.

Figure 6:
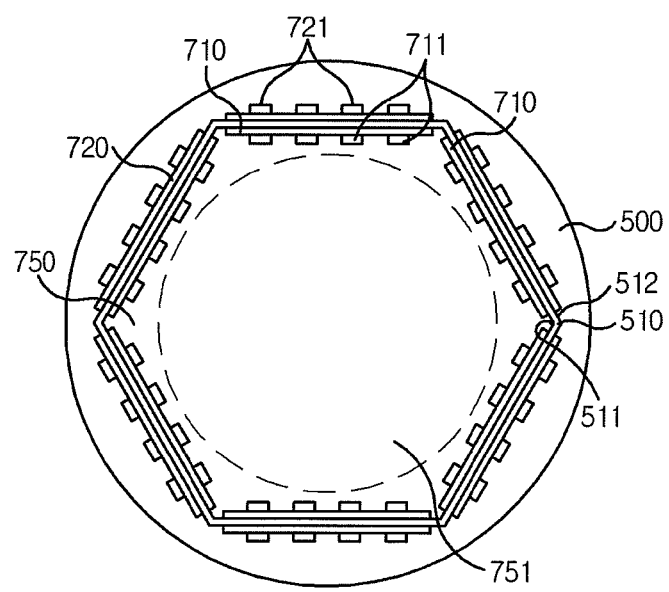
FIG. 6 is a schematic plane view illustrating an illuminator according to a second exemplary embodiment of the present disclosure.
Figure 7:
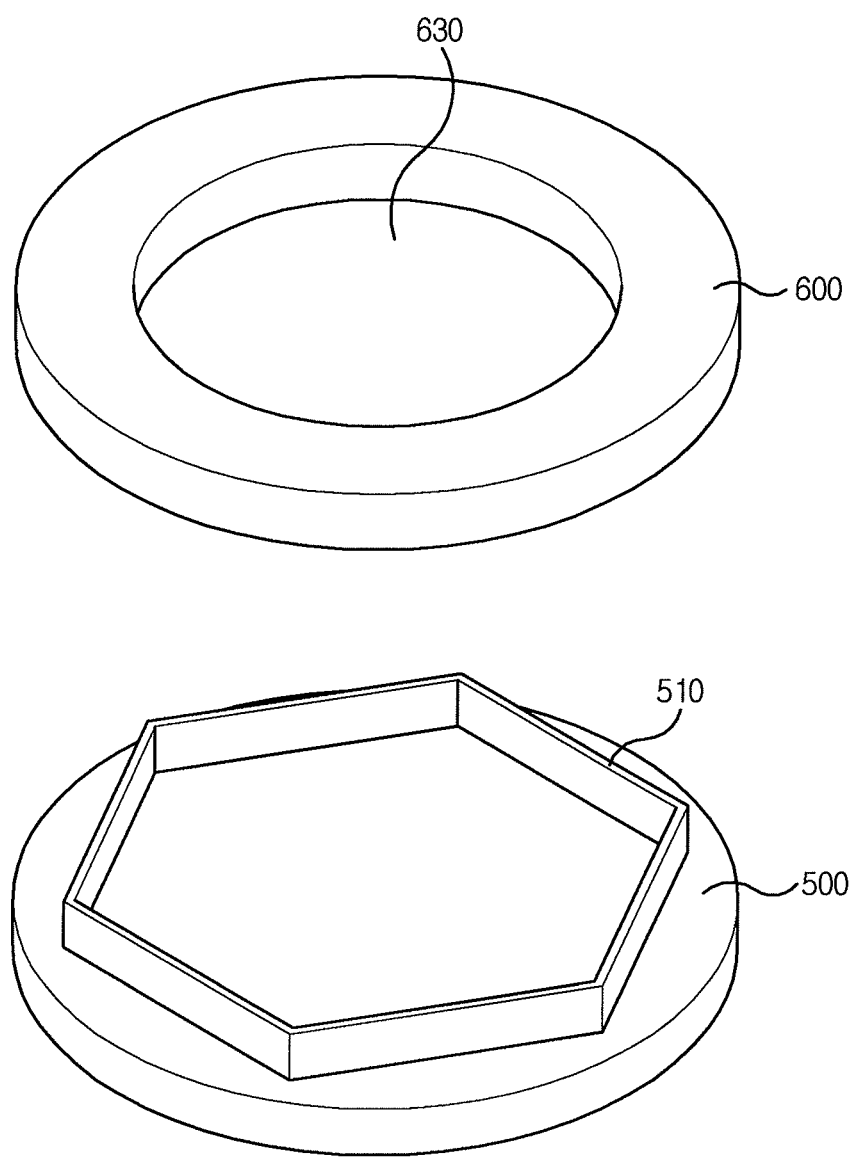
FIG. 7 is a schematic perspective view illustrating an illuminator according to a second exemplary embodiment of the present disclosure.
Figure 8:
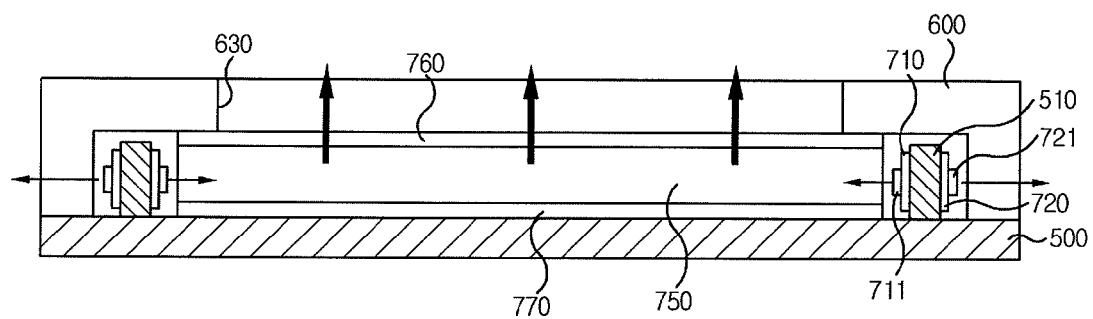
FIG. 8 is a sectional view of an illuminator according to the second exemplary embodiment of the present disclosure.

A second exemplary embodiment of an illuminator will be described with reference to FIGS. 6-13. Referring to FIGS. 6-8, a guide unit 510 of a polygonal ring configuration is formed on the bottom member 500 and first and second circuit boards 710 and 720 having first and second emitting diodes 711 and 721 mounted thereon are mounted on an inner side 511 and an outer side 512 of the guide unit 510 of the polygonal ring configuration, respectively. In this arrangement, the guide unit 510 has a through hole in its interior portion. The guide unit 510 may be formed of a metal that has excellent thermal conductivity, such as aluminum. The light guide member 750 is optically aligned with the first light emitting diodes 711 of the first circuit board 710 mounted on the inner side 511 of the guide unit 510 by being positioned inside the guide unit 510. Additionally, the top member 600 (shown in FIGS. 7 and 8) having a window 630 is coupled to the bottom member 500, and the inner area 751 of the light guide member 750 is exposed through the window 630 of the top member 600.

The illuminator according to the second exemplary embodiment of the present disclosure has an advantage that illumination can be performed in two modes. That is, the light emitted from the first light emitting diodes 711 is transferred to the light guide member 750 so that a first illumination function is performed, and light emitted from the second light emitting diodes 721 is transmitted to the outer side of the bottom member 500 so that a second illumination is performed.

The illuminator according to the second exemplary embodiment of the present disclosure described above also has an advantage that a thermal dissipation property is increased because the circuit boards having light emitting diodes mounted thereon are contacted with the sides of the guide unit and the contact area between the guide unit and the circuit boards is increased.

Further, it is desirable that the light guide member 750 has a polygonal configuration corresponding to the polygonal configuration of the guide unit 510 formed on the bottom member 500.

FIG. 7 is a schematic perspective view illustrating the arrangement of the top member 600 and bottom member 500. Specifically, the top member 600 is mounted on the bottom member 500 and coupled to it while enclosing the guide unit 510 formed on the bottom member 500. A coupling portion to couple and fix both bottom member 500 and top member 600 may be formed separately, and the coupling portion may be formed of various configurations to couple two discrete structures.

The top member 600 of this second exemplary embodiment is different from the top member 300 of the illuminator according to the first exemplary embodiment of the present disclosure. Specifically, because circuit boards 720 having light emitting diodes 721 mounted thereon are mounted on the outer side of the guide unit 510, a cover area to protect the circuit boards 720 is formed in the top member 600. By comparison, the top member 300 of the illuminator according to the first exemplary embodiment of the present has a flat configuration. In addition FIG. 8 is a sectional view of the illuminator according to the second exemplary embodiment of the present disclosure. Referring to FIG. 8, the light guide member 750 is arranged on an upper area of the bottom member 100 inside the guide unit 510. A reflective member 750 is located below the light guide member 750, and a diffusion member 760 is position on the light guide member 750. The first circuit boards 710 having the first light emitting diodes 711 mounted thereon are mounted on the inner side 511 of the guide unit 510, and the second circuit boards 720 having the second light emitting diodes 721 mounted thereon are mounted on the outer side of the guide unit 510. In this arrangement, light emitted from the first light emitting diodes 711 is directed outside the illuminator through the light guide member 750 and the diffusion member 760, and light emitted from the second light emitting diodes 721 is directed to the side of the illuminator through the top member 600. Accordingly, illumination can occur in two modes.

Figure 9:
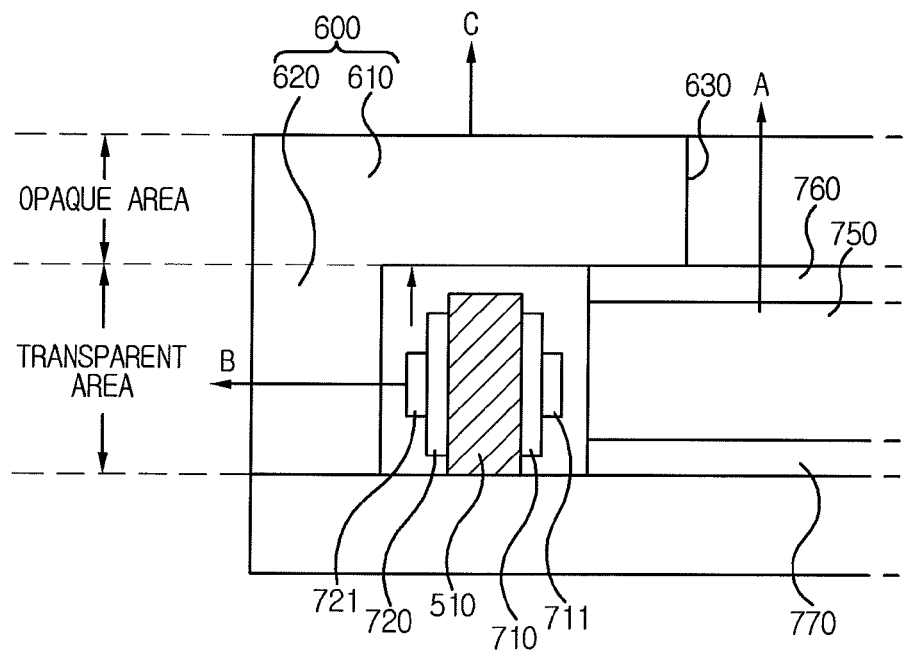
FIG. 9 is a partial schematic sectional view illustrating an illumination operation in the illuminator according to the second exemplary embodiment of the present disclosure.

FIG. 9 is a partial schematic sectional view illustrating an illumination operation of the illuminator according to the second exemplary embodiment of the present disclosure. In order for light emitted from the second light emitting diodes 721 to be visible at the side of the illuminator through the top member 600, the top member 600 should be formed of a transparent material of have a transparent region.

At the same time, because the intensity of the light out of the light emitting diodes 711 and 721 is high, a spot light may be transmitted to the outside indicating the locations of the light emitting diodes 711 and 721. When light emission from the light emitting diodes 711 and 721 revealing the location of the light emitting diodes 711 and 721 is visible, the beauty of the illumination may be deteriorated. Accordingly, an area of the top member 600 corresponding to the side of the guide unit 510 may be formed of a transparent area and the area top member 600 corresponding to the upper surface of the guide unit 510 may be formed of an opaque area. That is, the top member 600 may include an opaque area 610 and a transparent area 620, wherein the opaque area 610 blocks the light emitted from the first and second light emitting diodes 711 and 721 indicating the location of the first and second light emitting diodes 711 and 721, and the transparent area 620 illuminates by transmitting the light emitted from the second light emitting diodes 721 of the second circuit board 720. As shown in FIG. 9, light emitted from the first light emitting diodes 711 is transmitted in the 'A' direction, and light emitted from the second light emitting diodes 721 is transmitted in the 'B' direction. Light emitted from the first and second light emitting diodes 711 and 721 in the 'C' direction is blocked by the opaque area 610, so that this particular light emission from the first and second diodes 711 and 721 is not visible from the outside.

Figure 10:
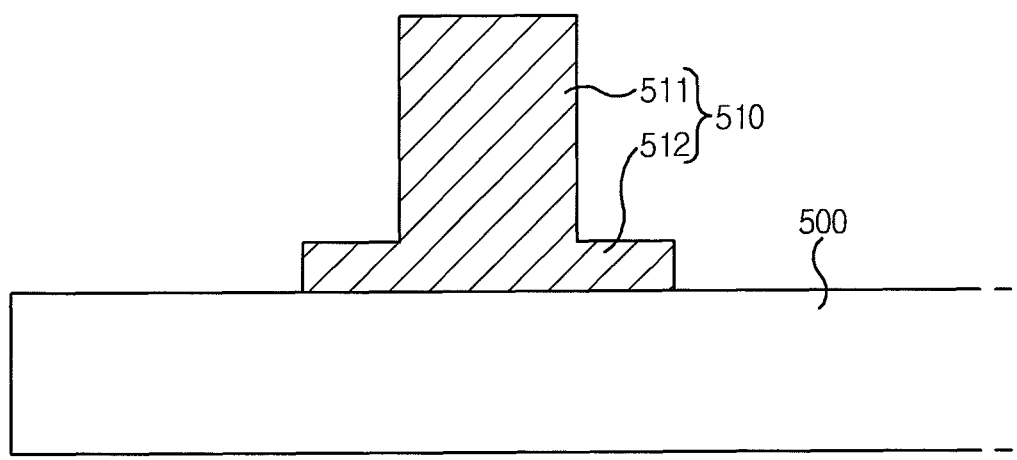
FIG. 10 is a partial schematic view illustrating an example of a guide unit applied according to the second exemplary embodiment of the present disclosure.

FIG. 10 is a partial schematic view illustrating an example of a guide unit applied according to the second exemplary embodiment of the present disclosure. Referring to FIG. 10, the guide unit 510 located on the bottom member 500 is constructed of a first structure 512 and a second structure 511 that projects on the first structure 512. The first structure 512 and second structure 511 may be formed as one unit, and the first structure 512 may be attached to the bottom member 500 by a metallic bond. In this exemplary embodiment, when the width of the first structure 512 is greater than the width of the second structure 511, the first structure is easily bonded to the bottom member 500. Therefore, the bottom member 500 and the guide unit 510 may be formed to have an excellent thermal conductivity, and the heat generated in the light emitting diodes 711 and 721 can be smoothly dissipated to the outside through the circuit boards 710, 720, the guide unit 510, and the bottom member 500.

Figure 11:
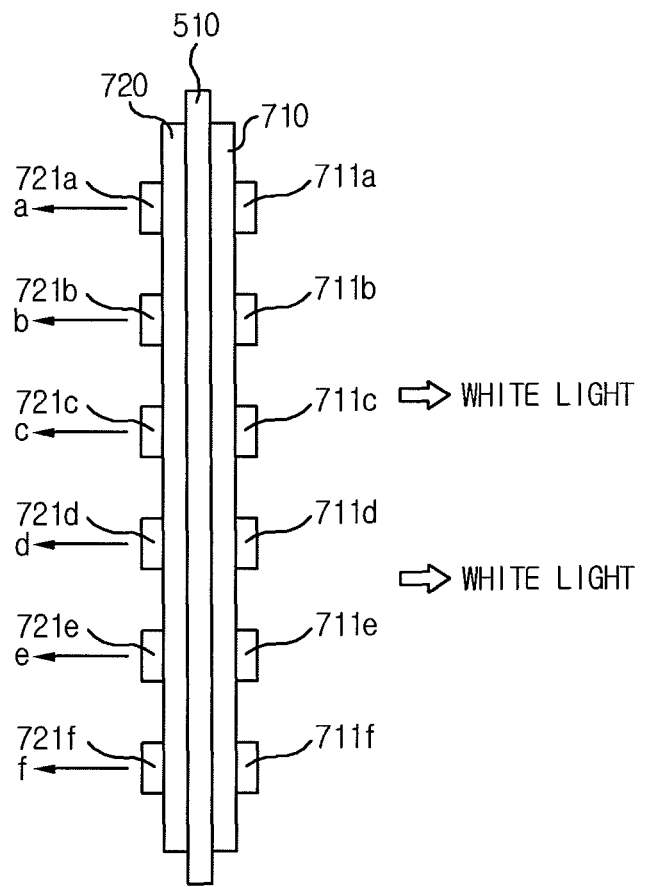
FIG. 11 is a partial schematic sectional view illustrating light emission from light emitting diodes of a circuit board mounted on a guide unit of the illuminator according to the second exemplary embodiment of the present disclosure.

FIG. 11 is a partial schematic sectional view illustrating light emission from the light emitting diodes 711 and 721 according to the second exemplary embodiment of the present disclosure. Referring to FIG. 11, the first circuit board 710 mounted on the inner side of the guide unit 510 has first light emitting diodes 711a, 711b, 711c, 711d, 711e and 711e mounted thereon. The second circuit board 720 mounted on the outer side of the guide unit 510 has the second emitting diodes 721a, 721b, 721c, 721d, 721e and 721f mounted thereon. The first light emitting diodes 711a, 711b, 711c, 711d, 711e and 711f are constructed of devices that emit a white light, and the second light emitting diodes 721a, 721b, 721c, 721d, 721e and 721f are constructed of devices that emit at least one of red light, blue light, green lights, or a compound color light of these lights. Therefore, it is possible to provide an interior illumination mode that emits a white light using the first light emitting diodes 711a, 711b, 711c, 711d, 711e and 711f and a mood illumination mode that emits at least one of red light, blue light, green lights, or a compound color light of these lights. As such, the illuminator according to the second exemplary embodiment of the present disclosure has an advantage that two illumination modes can be embodied using the guide unit 510.

Figure 12:
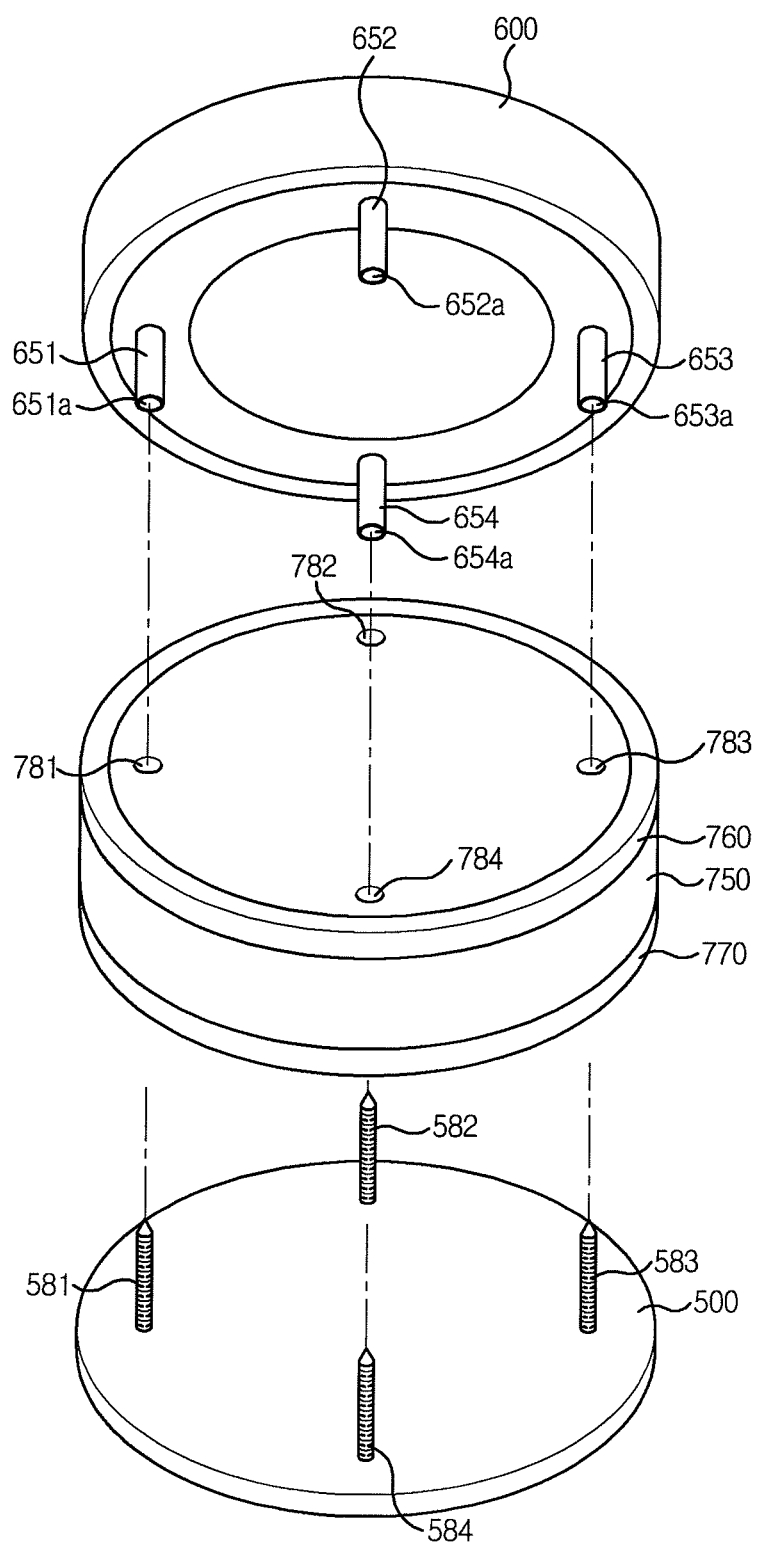
FIG. 12 is an exploded schematic view illustrating one means of coupling the top and bottom members of an illuminator according to the present disclosure.

FIG. 12 is an exploded schematic view illustrating another manner of connecting the top member, the bottom member, and the light guide member of the exemplary embodiments so that the light guide member is not movable with respect to the top member and bottom member. For purposed of explanation, reference will be made to the top member 600, bottom member 500, and light guide member 750 of the second exemplary embodiment.

As shown in FIG. 12, the reflective member 770 is positioned beneath the light guide member 750, and the diffusion member 760 is position on the light guide member 750 so that when the light guide member is coupled to the bottom member 500 the diffusion member 760 will be located between the light guide member 750 and the bottom member 500. The light guide member 750, the diffusion member 760, and the reflective member 770 have a plurality of through holes communicating with one another to form through holes 781, 782, 783 and 784. The top member 600 has a plurality of projections 651, 652, 653, and 654 formed therebeneath where the plurality of projections 651, 652, 653, and 654 are inserted into the plurality of through holes 781, 782, 783 and 784, respectively. The plurality of projections 651, 652, 653, and 654 having screw taps 651a, 652a, 653a, and 654a formed therein such that screws 581, 582, 583 and 584 inserted through the bottom member 500 are inserted into and coupled with the screw taps 651a, 652a, 653a, and 654a, respectively.

Figure 13:
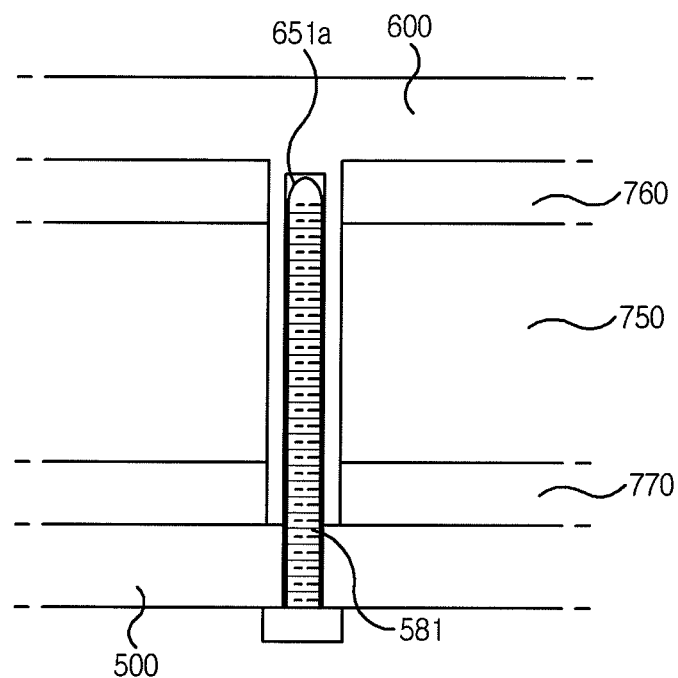
FIG. 13 is a partial schematic view illustrating a state where top and bottom members of an illuminator are coupled according to the present invention.

As shown in FIG. 13, the plurality of projections 651, 652, 653 and 654 formed beneath the top member 600 and having screw taps 651a, 652a, 653a and 654a formed therein are inserted into the plurality of through holes 781, 782, 783 and 784 that are formed in the light guide member 750, the diffusion member 760 and the reflective member 770, and the screws 581, 582, 583 and 584 projected above the bottom member 500 are inserted into and coupled with the screw taps 651a, 652a, 653a and 654a. Therefore, the light guide member 750, the diffusion member 760 and the reflective member 770 are coupled with and fixed to the top member 600 and the bottom member 500. Accordingly, the illuminator of the present disclosure has an advantage that a uniform optical property can be maintained by fixing the light guide member to the top and bottom members so as to prevent the light guide member from being movable, and by keeping the gap between the light guide member and the light emitting diode so as to maintain a precise optical alignment.

Figure 14A:
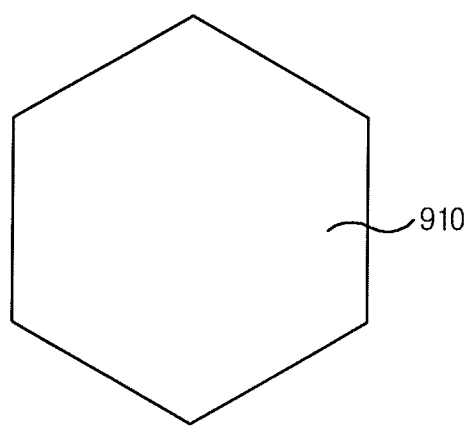
FIGS. 14*a* and 14*b* are plane views showing examples of configuration of a light guide member of an illuminator according to the present disclosure.
Figure 14B:
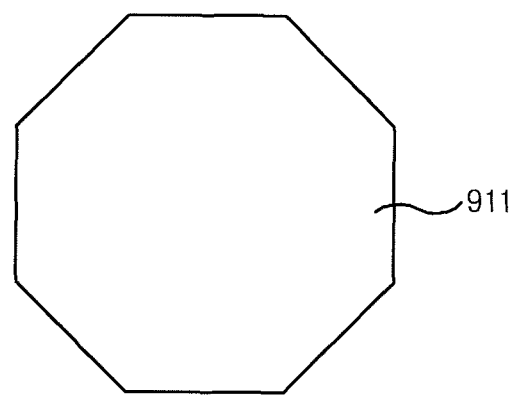

FIGS. 14a and 14b are plane views illustrating examples of configuration of a light guide member of an illuminator according to the present disclosure. In the first exemplary embodiment of the present disclosure, the light guide member 250 is a polygonal configuration corresponding to the polygonal configuration of the groove having the side wall of the polygonal configuration arranged in the bottom member 100. In the second exemplary embodiment of the present disclosure, the light guide member 750 has a polygonal configuration corresponding to the polygonal configuration of the guide unit 510 of the polygonal ring configuration formed on the bottom member 500.

While both exemplary embodiments show light guide members having six sides, it is understood that the light guide member of the present disclosure can be embodied in various polygonal configurations including a triangle through n-sided polygons. In some instances, it may be desirable that the light guide member has a configuration in which the side walls of the polygon are mutually symmetrical and the number of the side walls is multiples of 2. As examples, a light guide member 910 of a hexagonal configuration is shown in FIG. 14a and a light guide member 911 of an octagonal configuration is shown in FIG. 14b.

Further, in order to maximize the efficiency of the light guide member in the illuminator according to the present disclosure, the configuration of the light guide member 911 can be embodied in an octagon and the light guide member can be designed to have the thickness of 4 mm to 6 mm, as described above. When the thickness of the light guide member is less than 4 mm, the optical efficiency may be reduced, and when the thickness is greater than 6 mm, the light guide member may weight too much and its cost may become too high. In addition, the thickness of the light guide member should be greater than the width of the light emitting diodes described above. That is, when the width of the light emitting diodes is greater than the thickness of the light guide member, the entire amount of light emitted from the light emitting diodes is not incident to the light guide member so that light leakage phenomenon may be occurred.

In spite of the exemplary embodiment described above, the number of the light emitting diodes mounted on each face maybe be variable depending on the entire brightness of the illumination, and may be determined to be less than the maximum natural number among the numbers resulted by dividing one half of the length of the guide face by the width of the light emitting diode mounted along the length of one of the guide side.

Further, in the case that the guide unit is constructed having an inner guide face and the outer guide face, the light emitting diodes may be arranged opposite each other as described above or the light emitting diodes mounted on the inner guide face and the light emitting diodes mounted on the outer guide face may be arranged in a zigzag manner.

The illuminator of the present disclosure has an effect that a thermal dissipation property is enhanced by dissipating the heat generated in light emitting diodes of the light source through the bottom member, which has an excellent thermal conductivity. If circuit boards are used, the illuminator of the present disclosure has an effect that its thermal dissipation property is further increased because the circuit board having the light emitting diodes mounted thereon is contacted with the groove side wall of the bottom member or the side of the guide unit formed on the bottom member, whereby the contact area between the circuit board and the groove side wall or the guide unit is increased.

In addition, the illuminator of the present disclosure has an effect that assembly is simplified because it is possible to apply the light guide member of polygonal configuration. In addition, precise optical alignment can be maintained by coupling the light guide member with the top and bottom members so that the light guide member is not movable, and then by keeping the gap between the light guide member and the light emitting diode, whereby a uniform optical property can be maintained.

The illuminator of the present disclosure has an effect that illumination can occur in two modes, that is, light emitted from the first light emitting diodes of the first circuit board mounted on the inner side of the guide unit of the polygonal ring configuration is transferred to the light guide member so that it performs a first illumination function, and the light emitted from the second light emitting diodes of the second circuit board mounted on the inner side of the guide unit is transmitted to the outer side of the bottom member so that it performs a second illumination function.

In addition, the illuminator of the present disclosure has an effect that certain light emission from the light emitting diodes is not visible from outside by including the opaque area on the illuminator so as to block certain light emitted from the light emitting diodes, thereby preventing the beauty of the illuminator from being damaged.

Finally, while the top member, bottom member, light guide member, diffusion member, and reflective member have been shown as plates, it is understood that any suitable form can be used.

Hereinbefore, while the present disclosure is described in detail with respect to a detail example only, it is clear that one of ordinary skill in the art may recognize that various alterations and modifications that fall within the scope of the present disclosure may be possible, and the alterations and modifications are within following claims.

What is claimed is:

1. An illuminator comprising:
   a bottom member;
   a guide unit of a polygonal ring configuration located on the bottom member;
   a plurality of first circuit boards mounted on an inner side of the guide unit, each of the first circuit boards having a first light emitting diode mounted thereon;
   a plurality of second circuit boards mounted on an outer side of the guide unit, each of the second circuit boards having a second light emitting diode mounted thereon;
   a light guide member positioned inside the guide unit, the light guide member being optically aligned with the first light emitting diodes; and
   a top member coupled to the bottom member to surround the first and second light emitting diodes and the light guide member, the top member including a window through which an inner area of the light guide member is exposed, a transparent area coupled to the bottom member and an opaque area connecting the window and the transparent area,
   wherein the guide unit is positioned between the transparent area and the light guide member,
   wherein the first light emitting diodes are opposite the light guide member and the second light emitting diodes are opposite the transparent area, and
   wherein light emitted from the first light emitting diodes is directed outside the window through the light guide member, and light emitted from the second light emitting diodes is directed to the transparent area.

2. The illuminator according to claim 1, wherein the first light emitting diodes are constructed of devices that emit a white light and the second light emitting diodes are constructed of devices that emit at least one of a red light, a blue light, a green light, and a compound color light.

3. The illuminator according to claim 1, wherein the guide unit includes a first structure, and a second structure projecting from the first structure.

4. The illuminator according to claim 3, wherein the first and second structures are formed as one unit.

5. The illuminator according to claim 3, wherein the first structure is metallically bonded to the bottom member.

6. The illuminator according to claim 5, wherein a width of the first structure is greater than a width of the second structure.

7. The illuminator according to claim 1, wherein each of the first and second circuit boards is one of a printed circuit board having the corresponding light emitting diodes mounted thereon and a metal printed circuit board.

8. The illuminator according to claim 1, further comprising a reflective member located between the bottom member and the light guide member, and a diffusion member located above the light guide member.

9. The illuminator according to claim 1, wherein the light guide member is coupled to the top and bottom members.

10. The illuminator according to claim 1, wherein the light guide member has a plurality of through holes formed therein,
    wherein the top member has a plurality of projections positioned therebeneath, each of the projections of the plurality of projections being inserted into a corresponding through hole of the plurality of through holes, and each of the projections having screw taps formed therein, and
    wherein the bottom member has screws extending therethrough, the screws being inserted into and coupled with the screw taps.

* * * * *